(12) United States Patent
Alekseev et al.

(10) Patent No.: US 8,447,988 B2
(45) Date of Patent: May 21, 2013

(54) HASH PROCESSING USING A PROCESSOR

(75) Inventors: Dmitriy Vladimirovich Alekseev, Moscow (RU); Alexei Vladimirovich Galatenko, Moscow (RU); Ilya Viktorovich Lyalin, Moscow (RU); Alexander Markovic, Media, PA (US); Denis Vassilevich Parfenov, Moscow (RU)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 12/918,253

(22) PCT Filed: Sep. 16, 2009

(86) PCT No.: PCT/RU2009/000478
§ 371 (c)(1),
(2), (4) Date: Aug. 18, 2010

(87) PCT Pub. No.: WO2011/034456
PCT Pub. Date: Mar. 24, 2011

(65) Prior Publication Data
US 2012/0166773 A1    Jun. 28, 2012

(51) Int. Cl.
*H04L 9/00* (2006.01)
(52) U.S. Cl.
USPC .......................... 713/180; 712/221; 712/232
(58) Field of Classification Search
USPC ................... 713/180; 712/221, 232
See application file for complete search history.

(56) References Cited

U.S. PATENT DOCUMENTS

| 2006/0050887 | A1 | 3/2006 | Chen |
| 2010/0278331 | A1* | 11/2010 | Walker et al. ................... 380/28 |
| 2010/0281260 | A1* | 11/2010 | Farrugia et al. ............... 713/170 |
| 2011/0202775 | A1* | 8/2011 | Crispin et al. ................ 713/190 |

OTHER PUBLICATIONS

"Media Gateway Solution Based on Freescale's High-Performance Processors," www.freescale.com, Jun. 15, 2007 [retrieved by EPO on Jul. 28, 2010 from the Internet] (4 pages).
Lien, Roar et al., "A 1 Gbit/s Partially Unrolled Architecture of Hash Functions SHA-1 and SHA-512," Springer-Verlag, LNCS 2964, Jan. 30, 2004, pp. 324-338.
Grembowski, Tim , et al., "Comparative Analysis of the Hardware Implementations of Hash Functions SHA-1 and SHA-512," Springer-Verlag, LNCS 2433, Sep. 30, 2002, pp. 75-89.
PCT International Search Report dated Aug. 6, 2010 for International Application No. PCT/RU2009/000478 (15 pages).

(Continued)

*Primary Examiner* — Matthew Smithers
(74) *Attorney, Agent, or Firm* — Mendelsohn, Drucker & Associates, P.C.; Edward J. Meisarosh; Steve Mendelsohn

(57) ABSTRACT

In certain embodiments, a digital signal processor (DSP) has multiple arithmetic logic units and a register module. The DSP is adapted to generate a message digest H from a message M in accordance with the SHA-1 standard, where M includes N blocks $M^{(i)}$, i=1, ..., N, and the processing of each block $M^{(i)}$ includes t iterations of processing words of message schedule $\{W_t\}$. In each iteration possible, the DSP uses free operations to precalculate $W_t$ and working variable values for use in the next iteration. In addition, in each iteration possible, the DSP rotates the registers associated with particular working variables to reduce operations that merely copy unchanged values from one register to another.

20 Claims, 7 Drawing Sheets

OTHER PUBLICATIONS

"Secure Hash Signature Standard," Federal Information Processing Standards Publication 180-2 (FIPS 180-2), National Institute of Standards and Technology (NIST), http://csrc.nist.gov/, Aug. 1, 2002 [retrieved on Jun. 30, 2009]. Retrieved from the Internet: <URL: http://csrc.nist.gov/publications/fips/fips180-2/fips180-2.pdf> (75 pages).

"HMAC: Keyed-Hashing for Message Authentication," Request for Comment (RFC) 2104 of the Internet Engineering Task Force (IETF), www.ietf.org, Feb. 1997 [retrieved on Jul. 14, 2009]. Retrieved from the Internet: <URL: http://www.ietf.org/rfc/rfc2104.txt> pp. 1-11.

Dworkin, Morris. "Recommendation for Block Cipher Modes of Operation: Methods and Techniques," NIST Special Publication 800-38A, National Institute of Standards and Technology (NIST), Publ. 800-38A 2001 ED, 66 pages (Dec. 2001).

"Announcing the Advanced Encryption Standard (AES)," Federal Information Processing Standards Publication 197, National Institute of Standards and Technology (Nist), 51 pages, (Nov. 26, 2001).

Bertoni, G., et al.; "Error Analysis and Detection Procedure for a Hardware Implementation of the Advanced Encryption Standard"; IEEE Transactions on Computers, vol. 52, No. 4, Apr. 2003.

Wu et al., "Low Cost Concurrent Error Detection for the Advanced Encryption Standard", IEEE, 2004.

* cited by examiner

FIG. 1

100 for $i = 1$ to $N$:

{

1. Prepare the message schedule $\{W_t\}$ where: (2.1)

$$W_t = \begin{cases} M_t^{(i)} & \text{for } 0 \leq t \leq 15 \\ ROTL^1(W_{t-3} \oplus W_{t-8} \oplus W_{t-14} \oplus W_{t-16}) & \text{for } 16 \leq t \leq 79 \end{cases}$$

2. Initialize the five working variables $a$, $b$, $c$, $d$, and $e$ with the $(i-1)^{th}$ hash (2.2)
value, where:

$$a = H_0^{(i-1)}, b = H_1^{(i-1)}, c = H_2^{(i-1)}, d = H_3^{(i-1)}, \text{ and } e = H_4^{(i-1)}$$

3. For $t = 0$ to 79: (2.3)

{

$$T = ROTL^5(a) + f_t(b, c, d) + e + K_t + W_t$$

where $K_t$ is one of four predefined 32-bit constants, specifically, $$K_t = \begin{cases} \text{5a827999} & \text{for } 0 \leq t \leq 19 \\ \text{6ed9eba1} & \text{for } 20 \leq t \leq 39 \\ \text{8f1bbcdc} & \text{for } 40 \leq t \leq 59 \\ \text{ca62c1d6} & \text{for } 60 \leq t \leq 79 \end{cases}$$

$e = d$ $d = c$ $c = ROTL^{30}(b)$ $b = a$ $a = T$

}

4. Compute the $i^{th}$ intermediate hash value $H^{(i)}$: (2.4)

$$H_0^{(i)} = a + H_0^{(i-1)}, H_1^{(i)} = b + H_1^{(i-1)}, H_2^{(i)} = c + H_2^{(i-1)}, H_3^{(i)} = d + H_3^{(i-1)}, \text{ and}$$
$$H_4^{(i)} = e + H_4^{(i-1)}$$

}

$$H = H_0^{(N)} \| H_1^{(N)} \| H_2^{(N)} \| H_3^{(N)} \| H_4^{(N)}$$ (2.5)

200

300

| ITERATION # | D0 | D1 | D2 | D3 | D4 |
|---|---|---|---|---|---|
| 0 | a | b | c | d | e |
| 1 | b | c | d | e | a |
| 2 | c | d | e | a | b |
| 3 | d | e | a | b | c |
| 4 | e | a | b | c | d |

Set initial hash value $H^{(0)}$ as per the standard (7.1)
for $i = 1$ to $N$ do
{
//Initialize registers in registers module 204 of FIG. 2 for the processing of each (7.21)
block $M^{(i)}$
{
$D0 = H_0^{(i-1)}, D1 = H_1^{(i-1)}, D2 = H_2^{(i-1)}, D3 = H_3^{(i-1)}, D4 = H_4^{(i-1)} + K_0,$
$D5 = \neg H_1^{(i-1)}$, and $D6 = \text{Read}(W_0)$
}
for $t = 0$ to 79 do //Process the block $M^{(i)}$
{
$R_e = R_e + D6$ (7.22)
$D9 = R_a \ll 5$      // These two operations are carried out to (7.221)
$D10 = R_a \gg 27$      // simulate the $ROTL^5(a)$ operation (7.222)
if $(t \geq 15)$ then (7.223)
{
$D7 = D7 \oplus D8$ (7.224)
$D8 = \text{Read}(W_{t-7})$ (7.225)
$D11 = \text{Read}(W_{t-2})$ (7.226)
}
$D9 = D9 \oplus D10$ (7.227)
if $(t \geq 15)$ then
{
$W_t = \text{Write}(D6)$ (7.228)
$D8 = D8 \oplus D11$ (7.229)
}
if $(t \leq 19)$ then
{

FIG. 5 cont. (1)

$D10 = R_b \wedge R_c$                                                                              (7.230)

$D6 = R_d \wedge D5$     // D5 has the precomputed $\neg b$ for this $t$ range    (7.231)

} else if $(40 \leq t \leq 59)$

{

$D10 = R_b \wedge R_d$                                                                              (7.232)

$D6 = R_c \wedge D5$     // D5 has the precomputed $b \wedge d$ for this $t$ range    (7.233)

} else

{

$D10 = R_b \oplus R_c$     // no precomputed values needed for these $t$ ranges   (7.234)

$D6 = R_d$                                                                                                   (7.235)

}

$R_e = R_e + D9$                                                                             (7.236)

$D6 = D6 \oplus D10$     // D6 now has the value of $f_t$                    (7.237)

$D5 = R_b \ll 30$                                                                    (7.238)

if $(t \geq 15)$ then $D7 = D7 \oplus D8$                                                               (7.239)

$R_b = R_b \gg 2$                                                                     (7.240)

$R_e = R_e + D6$                                                                    (7.241)

if $(t \geq 15)$ then

{

$D6 = D7 \ll 1$                                                                (7.242)

$D9 = D7 \gg 31$                                                             (7.243)

$D7 = \text{Read}(W_{t-14})$                                                (7.244)

$D8 = \text{Read}(W_{t-12})$                                                (7.245)

}

$R_b = R_b \oplus D5$                                                              (7.246)

if $(t \leq 18)$ then

$D5 = \neg R_a$          //precompute $\neg b$ for the next cycle       (7.249)

} else if $(19 \leq t \leq 38)$ then $R_d = R_d + K_{20}$                              (7.250)

else if $(t == 39)$ $D5 = R_a \oplus R_c$        // precompute $b \oplus d$ for the next cycle      (7.251)

else if $(40 \leq t \leq 58)$ then

{

$R_d = R_d + K_{40}$                              (7.252)

$D5 = R_a \oplus R_c$                            (7.253)

} else if $(59 \leq t \leq 78)$ then $R_d = R_d + K_{60}$        // at the last iteration, constant is not be added    (7.254)

if $(t \geq 15)$ then $D6 = D6 \oplus D9$                          (7.255)

else $D6 = \text{Read}(W_{t+1})$     // Pre-fetch next $\{W_t\}$ value         (7.256)

}

Update the message digest

{

$H_j^{(i)} = Dj + H_j^{(i-1)}$ , where $j = 0, 1, 2, 3, 4$.            (7.26)

}

}

Output the final message digest, $H$, where                       (7.3)

| $t$ | CLK | ALU 1 | ALU 2 | ALU 3 | ALU 4 | Mem$_1$ I/O | Mem$_2$ I/O |
|---|---|---|---|---|---|---|---|
| FROM 0 TO 14 | 1 | $R_e=R_e+D6$ | $D5=D5 \wedge R_d$ | $D9=ROTL^5(R_a)$ | $D10=R_b \wedge R_c$ | | |
| | 2 | $R_b=ROTL^{30}(R_b)$ | $R_e=R_e+D9$ | $D6=D5 \oplus D9$ | | if($t$=14) D7 = Read($W_{t-14}$) | if($t$=14) D8=Read($W_{t-12}$) |
| | 3 | $R_d=R_d+K_0$ | $D5= \neg R_a$ | $R_e=R_e+D6$ | | D6=Read($W_t$) | |
| FROM 15 TO 19 | 1 | $R_e=R_e+D6$ | $D7=D7+D8$ | $D9=ROTL^5(R_a)$ | $D10=R_b \wedge R_c$ | D8=Read($W_{t-7}$) | D11=Read($W_{t-12}$) |
| | 2 | $R_b=ROTL^{30}(R_b)$ | $R_e=R_e+D9$ | $D6=R_d+D5$ | $D8=D8 \oplus D11$ | if($t$>15) Write(D6 -> $W_t$) | |
| | 3 | if($t$<19)D5=$\neg R_a$ else D5=$R_a \oplus R_c$ | $D6=D6 \oplus D10$ | $D7=D7 \oplus D8$ | | if($t$=19) D10=Read($W_{t-14}$) | if($t$=19) D11=Read($W_{t-12}$) |
| | 4 | if($t$<19)$R_d=R_d+K_0$ else $R_d=R_d+K_{20}$ | $R_e=R_e+D6$ | $D6=ROTL^1(D7)$ | | D7=Read($W_{t-14}$) | D8=Read($W_{t-12}$) |
| FROM 20 TO 39 AND FROM 60 TO 79 | 1 | $R_e=R_e+D6$ | $D7=D7+D8$ | $D9=ROTL^5(R_a)$ | $D10=R_b \wedge R_c$ | D8=Read($W_{t-7}$) | D11=Read($W_{t-1}$) |
| | 2 | $R_b=ROTL^{30}(R_b)$ | $R_e=R_e+D9$ | $D5=D5 \oplus R_c$ | $D7=D7 \oplus D9$ | Write(D6->$W_t$) | D8=Read($W_{t-12}$) |
| | 3 | if($t$<39) $R_d=R_d+K_{20}$ if($t$=39) $R_d=R_d+K_{40}$ if($t$>59 and $t$<79) $R_d=R_d+K_{60}$ | $R_e=R_e+D5$ | $D5=R_a \oplus R_c$ | $D6=ROTL^1(D7)$ | D7=Read($W_{t-14}$) | D10=Read($W_{t-6}$) |
| FROM 40 TO 59 | 1 | $R_e=R_e+D6$ | $D7=D7+D8$ | $D9=ROTL^5(R_a)$ | $D10=R_b \wedge R_d$ | D8=Read($W_{t-7}$) | D11=Read($W_{t-2}$) |
| | 2 | $R_b=ROTL^{30}(R_b)$ | $R_e=R_e+D9$ | $D6=R_c \wedge D_5$ | $D8=D8 \oplus D11$ | Write(D6->$W_t$) | |
| | 3 | $D5=R_a \oplus R_c$ | $D6=D6 \oplus D10$ | $D7=D7 \oplus D8$ | | if($t$=59) D10=Read($W_{t-7}$) | if($t$=59) D11=Read($W_{t-12}$) |
| | 4 | if($t$<59)$R_d=R_d+K_{40}$ else $R_d=R_d+K_{60}$ | $R_e=R_e+D6$ | $D6=ROTL^1(D7)$ | | D7=Read($W_{t-14}$) | D8=Read($W_{t-12}$) |

HASH PROCESSING USING A PROCESSOR

BACKGROUND OF THE INVENTION

1. Field of the Invention

The current invention relates to performing hash functions, and in particular, to performing hash functions for data authentication.

2. Description of the Related Art

It may sometimes be necessary, for security and/or data integrity, to be able to authenticate and verify stored or transmitted data or messages. Such authentication and verification capabilities may be provided by secret-key-based message-authentication codes (MACs). Keyed-Hashing for Message Authentication Code (HMAC), which uses cryptographic hash functions, is one such mechanism for message authentication and verification. HMAC is described in Request for Comment (RFC) 2104 of the Internet Engineering Task Force (IETF), titled "HMAC: Keyed-Hashing for Message Authentication," incorporated herein by reference in its entirety.

HMAC may be used to authenticate secure real-time protocol (SRTP) packets. SRTP is a secure version of RTP, where RTP is a protocol for delivering media content over a packet-switched network, such as the Internet. SRTP provides security, integrity, and authentication for RTP packets. Packet authentication and integrity are achieved using HMAC, which is used to produce an authentication tag that is appended to the packet.

HMAC uses a cryptographic hash function, H, and a secret key, K, to generate a hash output of length L bytes from a block text of length B bytes. The length of secret key K should be greater than or equal to L bytes and less than or equal to B bytes; keys that are too short provide insufficient security, while keys that are too long are typically trimmed to length B bytes. HMAC uses an inner padding pad ipad and an outer padding pad opad, where ipad=the byte 0x36 repeated B times and opad=the byte 0x5C repeated B times. The function HMAC for input block text is defined as per Formula (1) below:

$$H((K \text{ XOR } o\text{pad}) \| H((K \text{ XOR } i\text{pad}) \| \text{text})) \quad (1)$$

where, ∥ is a concatenation operator and, if key K is shorter than B bytes, then zeroes are appended to the end of key K to create a B-byte string. The steps represented by Equation (1) are performed as follows:

(a) perform a bitwise XOR of key K (with appended zeroes, if needed) and pad ipad;
(b) concatenate the result of step (a) with block text;
(c) apply hash function H to the result of step (b);
(d) perform a bitwise XOR of key K and pad opad;
(e) concatenate the result of step (d) with the result of step (c); and
(f) apply hash function H to the result of step (e).

Note that the steps above do not have to be performed in the above sequence; for example, step (d) may be performed before any of the other steps.

Examples of hash function H include iterative, cryptographic hash functions such as MD5 (message-digest algorithm 5) and SHA-1 (secure hash algorithm 1). HMAC using SHA-1 is typically referred to as HMAC-SHA-1. SHA-1 is described in Federal Information Processing Standards Publication 180-2 (FIPS 180-2), titled "Secure Hash Signature Standard," published by the National Institute of Standards and Technology (NIST), and incorporated herein by reference in its entirety. SHA-1 is an iterative, one-way hash function that processes a message to produce a condensed representation called a message digest. SHA-1 enables the determination of the message's integrity since a change to the message will very likely result in a change to the corresponding message digest.

Running the SHA-1 algorithm includes two stages: preprocessing and hash computation. Preprocessing includes three steps: (1) padding a message, (2) parsing the padded message into fixed-size blocks, and (3) setting initialization values to be used in the hash computation. The hash computation then generates a message schedule from the padded message and uses that schedule, along with certain functions, constants, and word operations to iteratively generate a series of hash values. The final hash value generated by the hash computation is used to determine the message digest.

SHA-1 operates on 512-bit blocks and, therefore, the padding outputs a padded message whose length in bits is an integer multiple of 512. To pad a message M of length l bits, where $0 \leq l < 2^{64}$, (a) append the bit "1" to the end of message M, (b) add k zeroes, where k is the smallest non-negative solution to the congruence relation $l+1+k \equiv 448 \pmod{512}$, and (c) append a 64-bit block equal to the number l in binary. This resultant padded message has a bit-length that is an integer multiple of 512. Next, the padded message is parsed into N 512-bit blocks referenced as $M^{(1)}, M^{(2)}, \ldots M^{(N)}$. Each block $M^{(i)}$ consists of sixteen 32-bit (4-byte) words referenced as $M^{(i)}_j$, where j runs from 0 to 15. Thus, for example, the second word of the third block would be referenced as $M^{(3)}_1$. The final preprocessing step is setting the initial hash value $H^{(0)}$ to the concatenation of five predetermined 32-bit (4-byte) words $H^{(0)}_0, H^{(0)}_1, H^{(0)}_2, H^{(0)}_3,$ and $H^{(0)}_4$.

FIG. 1 shows pseudo-code 100 for Algorithm (2) for the sequential processing of message blocks $M^{(1)}, M^{(2)}, \ldots M^{(N)}$ that is at the core of the hash computation. Algorithm (2) is performed once for each one of the N message-block iterations. The hash computation uses (i) a message schedule $\{W_t\}$ of eighty 32-bit words $W_0, W_1, \ldots W_{79}$ and (ii) five working variables, a, b, c, d, and e. Note that $\oplus$ is a bitwise XOR operator and ROTL$^n$(x) is a rotate-left (circular left shift) operator, which circularly left-rotates word x by n bytes; thus, the first sixteen words of message schedule $\{W_t\}$ are the sixteen words of block $M^{(i)}$, while the other 64 words of the message schedule are functions of those first sixteen words. In addition, note that $f_t$ is one of three predefined functions, described below, which outputs a 32-bit word.

Algorithm (2) comprises, for each message block $M^{(i)}$, preparing message schedule $\{W_t\}$, initializing the working variables, processing the message block in eighty message-schedule iterations, and updating the hash value $H^{(i)}$. After repeating steps 1 through 4 of Algorithm (2) a total of N times, i.e., after processing the $N^{th}$ block of M, i.e., $M^{(N)}$, the resulting 160-bit message digest of the message M is H.

Note that the logical function $f_t(x, y, z)$ is defined as per Formula (3) below:

$$f_t(x, y, z) = \begin{cases} Ch(x, y, z) = (x \wedge y) \oplus (\neg x \wedge z) & \text{for } 0 \leq t \leq 19 \quad (3.1) \\ \text{Parity}(x, y, z) = (x \oplus y \oplus z) & \text{for } 20 \leq t \leq 39 \quad (3.2) \\ Maj(x, y, z) = (x \wedge y) \oplus (x \wedge z) \oplus (y \wedge z) & \text{for } 40 \leq t \leq 59 \quad (3.3) \\ \text{Parity}(x, y, z) = (x \oplus y \oplus z) & \text{for } 60 \leq t \leq 79 \quad (3.4) \end{cases}$$

where $\wedge$ is a bitwise AND operator, $\oplus$ is a bitwise XOR operator, and $\neg$ is a bitwise complement operator.

Furthermore, note that alternative methods may be used under SHA-1 to come up with the same message digest.

Generating the message digest requires at least 1360 processor operations per 512-byte block and may require an even greater number of clock cycles since some operations require processor stalls between them so as to let data stabilize and prevent certain errors. Novel systems and methods to generate a message digest more efficiently may be useful.

SUMMARY OF THE INVENTION

One embodiment of the invention can be a processor comprising a plurality of arithmetic logic units (ALUs) and a plurality of registers. The processor performs hash processing on a string message comprising N message blocks to generate a message digest from the string message. The processor uses (1) a message schedule having G message-schedule words and (2) a plurality of working variables, each working variable associated with a corresponding register of the plurality of registers. The processing of each message block of the N message blocks comprises G message-schedule iterations, each message-schedule iteration comprising: (i) processing a message-schedule word corresponding to the iteration, (ii) processing values of the working variables, (iii) updating at least one working variable based on the processed message-schedule word, and (iv) updating at least one working variable based on the processed value of one or more working variables. The processor performs, in at least one of the message-schedule iterations, at least one of (a) generating the message-schedule word corresponding to a next message-schedule iteration, (b) pre-processing the value of at least one working variable for the next message-schedule iteration, and (c) varying, from a previous message-schedule iteration, relationships of two or more of the working variables to the corresponding registers. The processor uses all the ALUs of the plurality of ALUs in parallel in at least one of the message-schedule iterations.

Another embodiment of the invention can be a method for a processor comprising a plurality of arithmetic logic units (ALUs) and a plurality of registers. The method comprises performing hash processing on a string message comprising N message blocks to generate a message digest from the string message. The method further comprises using (1) a message schedule having G message-schedule words and (2) a plurality of working variables, each working variable associated with a corresponding register of the plurality of registers. The method also comprises processing each message block of the N message blocks in G message-schedule iterations, each message-schedule iteration comprising (i) processing a message-schedule word corresponding to the iteration, (ii) processing values of the working variables, (iii) updating at least one working variable based on the processed message-schedule word, and (iv) updating at least one working variable based on the processed value of one or more working variables. The method additionally comprises performing, in at least one of the message-schedule iterations, at least one of (a) generating the message-schedule word corresponding to a next message-schedule iteration (b) pre-processing the value of at least one working variable for the next message-schedule iteration, and (c) varying, from a previous message-schedule iteration, relationships of two or more of the working variables to the corresponding registers. The method, in addition, comprises using, by the processor, all the ALUs of the plurality of ALUs in parallel in at least one of the message-schedule iterations.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 1 shows a pseudo-code for a hashing algorithm.

FIG. 5 shows a pseudo-code for an algorithm for programming the processor of FIGS. 2 and 3.

FIG. 6 shows a table illustrating the processing steps in an alternative implementation of the processor of FIG. 2.

DETAILED DESCRIPTION

Figures 2, 3:
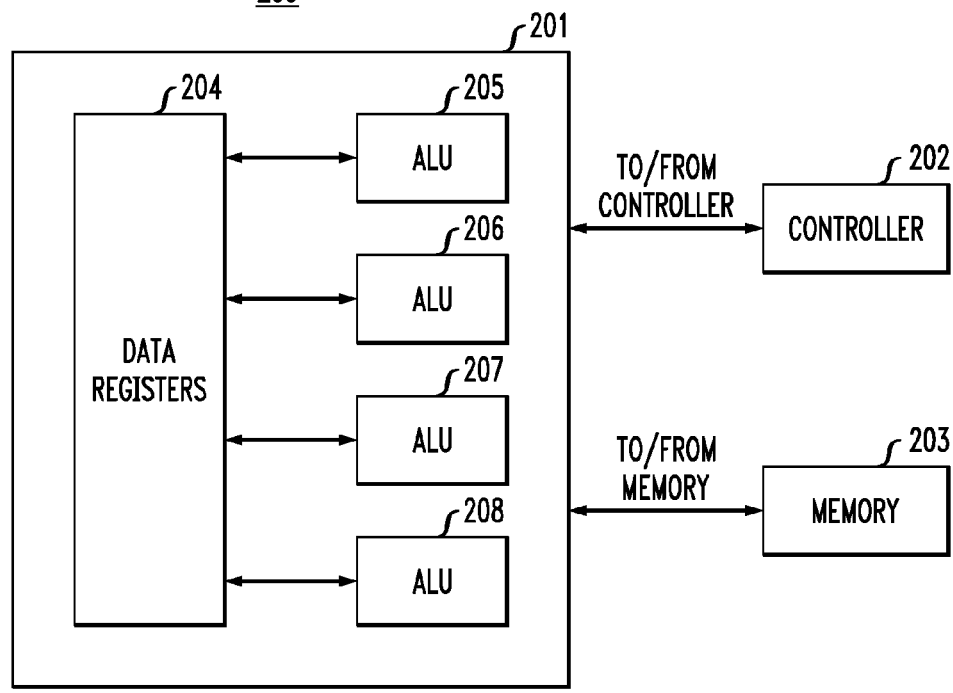
FIG. 2 shows a simplified block diagram of a processing device in accordance with one embodiment of the present invention.
FIG. 3 shows a table that illustrates how variables may be rotated in a five-cycle loop in one implementation of the processor of FIG. 2.

FIG. 2 shows a simplified block diagram of processing device 200 comprising processor 201, controller 202, and memory 203. Processor 201 comprises multiple arithmetic logic units (ALUs), specifically, ALUs 205, 206, 207, and 208. Processor 201 further comprises data register module 204, which comprises 16 data registers labeled D0-D15 (not shown individually). During each clock cycle of processor 201, processor 201 may perform up to two input/output (I/O) operations, and each of ALUs 205, 206, 207, and 208 may perform one arithmetic operation (for a total of four arithmetic operations for processor 201). These features of processor 201 may be used to more-efficiently process each 512-byte block of a message M, and thereby more efficiently generate message M's message digest. Several efficiency-enhancing strategies are presented below. These strategies may be used individually or in combination.

First, note that, when using processor 201 to calculate the value T of Formula (2.3) in parallel, not all of the ALUs would be used in every clock cycle. In one exemplary implementation, 5 clock cycles are needed to perform the operations of Formula (2.3) on a 4-ALU parallel processor, but only 11-13 arithmetic operations in total are required for Formula (2.3), depending on the particular $f_t$ function for the iteration. Since 20 arithmetic operations may be performed in 5 clock cycles by processor 201, there are 7-9 so-called free operations available. These free operations may be used to perform other calculations. In one implementation, the free operations are used to calculate future values of $W_t$ in accordance with Formula (2.1).

Second, note that one of the operations performed in determining the value T in accordance with Formula (2.3) is adding the constant $K_t$ to the variable e. This sum may be pre-calculated. Note that, in performing Formula (2.2), the variable e is assigned hash-word $H^{(i-1)}_4$. The performance of Formula (2.2) may be changed so that variable e is assigned the sum of the hash-word $H^{(i-1)}_4$ and the constant $K_t$, or $$e = H^{(i-1)}_4 + K_t \quad (4.1)$$

Then the corresponding modifications to Formula (2.3) would be as follows:

$$T = ROTL^5(a) + f_t(b,c,d) + e + W_t, \text{ and} \quad (4.2)$$

$$e = d + K_{t+1} \quad (4.3)$$

where $K_t$ is not in the summation of Formula (4.2) since it is already included in variable e. Note that, since $K_0 = K_1 = K_2 \ldots = K_{19}$, $K_{20} = K_{21} = K_{22} \ldots = K_{39}$, etc., the above-used subscripts for $K_t$ may be changed to an extent without affecting the outcome.

Third, note that many of the operations of Formula (2.3) are simply moves of values from one variable to another. Normally, each move would involve writing new values to the respective registers associated with the variables. However, since those new values already exist in other registers, processor 201 may instead keep the data in the same register, and, instead, vary which variable is associated with which register.

FIG. 3 shows Table 300, which illustrates how the variables may be rotated in a five-cycle loop in one implementation of processor 201 of FIG. 2. Table 300 shows which variables are stored in registers D0-D4 over iterations 0-4 of a five-cycle loop. A corresponding alternative table (not shown) may show the same relationship in terms of which registers store variables a-e over iterations 0-4 of the five-cycle loop.

As would be appreciated by one of ordinary skill in the art, there are multiple ways to represent and/or accomplish the above-described rotation of variables or registers. In one implementation, register handles $R_a$, $R_b$, $R_c$, $R_d$, and $R_e$ are used, wherein the particular register to which a register handle refers to is dynamically determined based on the iterative value of t (where t=0 to 79) in which it is used, as per Formula (5) below:

$$R_a = D[(5-(t \bmod 5)) \bmod 5]$$

$$R_b = D[(6-(t \bmod 5)) \bmod 5]$$

$$R_c = D[(7-(t \bmod 5)) \bmod 5]$$

$$R_d = D[(8-(t \bmod 5)) \bmod 5]$$

$$R_e = D[(9-(t \bmod 5)) \bmod 5] \quad (5)$$

where mod represents a modular-arithmetic operation.

Alternatively, the register handles can be determined using Formula (6) below:

$$R_a = \begin{cases} D0, & t \equiv 0 \pmod 5 \\ D4, & t \equiv 1 \pmod 5 \\ D3, & t \equiv 2 \pmod 5 \\ D2, & t \equiv 3 \pmod 5 \\ D1, & t \equiv 4 \pmod 5 \end{cases} \quad (6.1)$$

$$R_b = \begin{cases} D1, & t \equiv 0 \pmod 5 \\ D0, & t \equiv 1 \pmod 5 \\ D4, & t \equiv 2 \pmod 5 \\ D3, & t \equiv 3 \pmod 5 \\ D2, & t \equiv 4 \pmod 5 \end{cases} \quad (6.2)$$

$$R_c = \begin{cases} D2, & t \equiv 0 \pmod 5 \\ D1, & t \equiv 1 \pmod 5 \\ D0, & t \equiv 2 \pmod 5 \\ D4, & t \equiv 3 \pmod 5 \\ D3, & t \equiv 4 \pmod 5 \end{cases} \quad (6.3)$$

$$R_d = \begin{cases} D3, & t \equiv 0 \pmod 5 \\ D2, & t \equiv 1 \pmod 5 \\ D1, & t \equiv 2 \pmod 5 \\ D0, & t \equiv 3 \pmod 5 \\ D4, & t \equiv 4 \pmod 5 \end{cases} \quad (6.4)$$

$$R_e = \begin{cases} D4, & t \equiv 0 \pmod 5 \\ D3, & t \equiv 1 \pmod 5 \\ D2, & t \equiv 2 \pmod 5 \\ D1, & t \equiv 3 \pmod 5 \\ D0, & t \equiv 4 \pmod 5 \end{cases} \quad (6.5)$$

Figure 4:
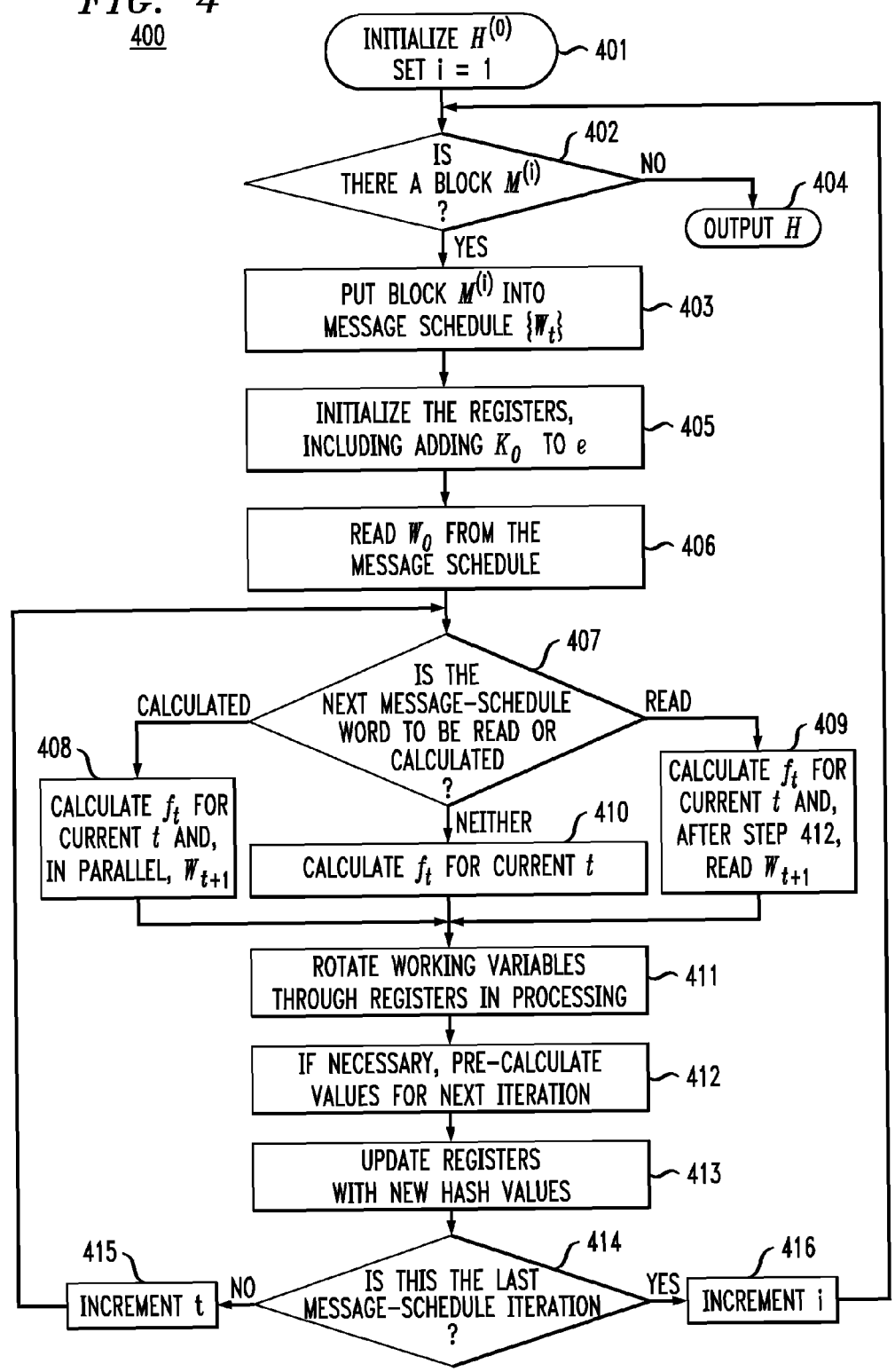
FIG. 4 shows a flowchart showing the processing of a message by the processor of FIGS. 2 and 3.

FIG. 4 shows flowchart 400 showing the processing of message M by processor 201 of FIG. 2 in accordance with one embodiment of the present invention. The process starts with the initialization of the message digest with initial hash value $H^{(0)}$ and the setting of block-counter i to 1 (step 401). Next, it is determined whether there is another block $M^{(i)}$ to process (step 402). If the determination is step 402 is no (typically, after all N blocks of message M have been processed), then the process terminates with the output of message digest H, which is based on the final hash value $H^{(N)}$ (step 404). If the determination in step 402 is yes (for i=1 to N), then block $M^{(i)}$ is put into the first 16 words of message schedule $\{W_t\}$ in memory 203 of FIG. 2, and the iterative processing through the message schedule begins with t=0 (step 403). Next, processor 201 initializes the appropriate registers in register module 204, including adding constant $K_0$ to the register storing working variable e (step 405). Next, processor 201 reads word $W_0$ from message schedule $\{W_t\}$ in memory 203 (step 406).

After step 406, it is determined whether the subsequent message-schedule word, i.e., $W_{t+1}$, is to be read (for $t \leq 15$), calculated (for $16 \leq t \leq 78$), or neither (for t=79) (step 407). If it is determined that word $W_{t+1}$ is to be read, then processor 201 calculates logical function $f_t$ for the current word counter value t and, after step 412, reads word $W_{t+1}$ from memory 203 into the appropriate register (step 409).

If it is determined in step 407 that word $W_{t+1}$ is to be calculated, then processor 201 calculates logical function $f_t$ for the current message-schedule iteration value t and, in parallel, calculates word $W_{t+1}$, saving the result in the appropriate register (step 408).

If it is determined in step 407 that neither applies, then processor 201 calculates logical function $f_t$ for the current message-schedule iteration value t (step 410).

Regardless of the determination in step 407, processor 201 rotates, as necessary, the working variables through the registers in the processing of iteration t as described above in Formulas (5) and/or (6) (step 411). Next, if necessary, processor 201 pre-calculates values for the next iteration (step 412). Then, processor 201 updates the appropriate registers with the newly determined latest hash values (step 413). Then, it is determined whether this is the last message-schedule iteration (i.e., if t=79) (step 414). If the determination of step 414 is no, then the word counter value t is incremented (step 415), and the process returns to step 407. If the determination of step 414 is yes, then message-block iteration value i is incremented (step 416), and the process returns to step 402.

FIG. 5 shows pseudo-code 500 for Algorithm (7) for programming processor 201 of FIG. 2, using the above-described register-handle notation, to determine the message digest H of a message M using all three of the above-described efficiency-enhancing strategies. Note that "//" in the pseudo-code below represents the start of a comment, "=" represents an assignment, "==" represents a determination of equality, "⊕" represents a bitwise XOR operation, "∧" represents a bitwise AND operation, "¬" represents a bitwise complement operation, "a<<b" represents a left shift of word a by b bits, "a>>b" represents a right shift of word a by b bits (note that, in general, for 32-bit words, (a<<b) ⊕(a>>(32-b)) is equivalent to $ROTL^b$ (a)), "+" represents a modulo-$2^{32}$ addition, "c=Read(d)" represents reading the value represented by d from memory 203 into the register represented by c, and "e=Write(f)" represents writing the value represented by register f to a location in memory 203 represented by e. Note that block $M^{(i)}$ and message schedule $\{W_t\}$ are accessed from memory 203 of FIG. 2, and the first 16 words of message schedule $\{W_t\}$ are the words of block $M^{(i)}$.

In one implementation of processor 201 of FIG. 2, processor 201 is a digital signal processor (DSP) using a StarCore 3400 processor core from StarCore LLC, formerly of Austin, Tex. In this implementation of processor 201, the processing of each block $M^{(i)}$ using Formula (7) of FIG. 5 may take up 5 clock cycles, with operations taking place in each clock cycle organized as follows: Cycle 0—Formulas (7.221)-(7.226), Cycle 1—Formulas (7.227)-(7.235), Cycle 2—Formulas (7.236)-(7.239), Cycle 3—Formulas (7.240)-(7.245), and Cycle 4—Formulas (7.246)-(7.256).

It should be noted that the ALUs of the StarCore 3400 DSP do not perform an ROTL operation in a single clock cycle. A different processor, however, having a different architecture that has ALUs that can perform an ROTL operation in a single clock cycle, might be able to go through each of the 80 message schedule iterations (i.e., of word counter value t) for block $M^{(i)}$ in four or fewer clock cycles by making simple modifications to Formula (7), as would be appreciated by a person of ordinary skill in the art. Combining a left-shift operation (e.g., Formula (7.221) and/or Formula (7.238)), a right-shift operation (e.g., Formula (7.222) and/or Formula (7.240)), and a bitwise XOR operation (e.g., Formula (7.227) and/or Formula (7.246)) into a single ROTL operation may be one such modification. Making these modifications may, in combination with appropriate variable pre-computation, reduce the time for some iterations of word counter value t to a mere three clock cycles.

FIG. 6 shows Table 600, which illustrates the processing steps of processor 201 of FIG. 2, when implemented using a processor that can perform a rotate-left (ROTL) operation as a single arithmetic operation. Table 600 shows the processing steps for processor 201 to process a message block $M^{(i)}$. Table 600 shows, for each value of word counter t from 0 to 79, i.e., for each word of message schedule $\{W_t\}$, how many clock cycles are needed, and, for each clock cycle, (i) which arithmetic operations are performed by each of the four ALUs and (ii) which read/write operation are performed by processor 201. As would be appreciated by one of ordinary skill in the art, Table 600 may be used as a guide to generate operational code for processor 201.

As would be understood by one of ordinary skill in the art, the organization and content of the individual formulas of Formula (7) may be further adjusted to account for variations in the particular architecture of the processor for which the code is intended. Similarly, adjustments may be made to the operational details provided in Table 600 of FIG. 6 to account for variations in the particular architecture of the processor.

References herein to the verb "to set" and its variations in reference to values of fields do not necessarily require an active step and may include leaving a field value unchanged if its previous value is the desired value. Setting a value may nevertheless include performing an active step even if the previous or default value is the desired value.

Unless indicated otherwise, the term "determine" and its variants as used herein refer to obtaining a value through measurement and, if necessary, transformation. For example, to determine an electrical-current value, one may measure a voltage across a current-sense resistor, and then multiply the measured voltage by an appropriate value to obtain the electrical-current value. If the voltage passes through a voltage divider or other voltage-modifying components, then appropriate transformations can be made to the measured voltage to account for the voltage modifications of such components and to obtain the corresponding electrical-current value.

As used herein in reference to data transfers between entities in the same device, and unless otherwise specified, the terms "receive" and its variants can refer to receipt of the actual data, or the receipt of one or more pointers to the actual data, wherein the receiving entity can access the actual data using the one or more pointers.

Exemplary embodiments have been described wherein particular entities (a.k.a. modules) perform particular functions. However, the particular functions may be performed by any suitable entity and are not restricted to being performed by the particular entities named in the exemplary embodiments.

Exemplary embodiments have been described with data flows between entities in particular directions. Such data flows do not preclude data flows in the reverse direction on the same path or on alternative paths that have not been shown or described. Paths that have been drawn as bidirectional do not have to be used to pass data in both directions.

References herein to the verb "to generate" and its variants in reference to information or data do not necessarily require the creation and/or storage of new instances of that information. The generation of information could be accomplished by identifying an accessible location of that information. The generation of information could also be accomplished by having an algorithm for obtaining that information from accessible other information.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, microcontroller, or general-purpose computer.

It will be further understood that various changes in the details, materials, and arrangements of the parts which have been described and illustrated in order to explain the nature of this invention may be made by those skilled in the art without departing from the scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Unless explicitly stated otherwise, each numerical value and range should be interpreted as being approximate as if the word "about" or "approximately" preceded the value of the value or range. As used in this application, unless otherwise explicitly indicated, the term "connected" is intended to cover both direct and indirect connections between elements.

For purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. The terms "directly coupled," "directly connected," etc., imply that the connected elements are either contiguous or connected via a conductor for the transferred energy.

The use of figure numbers and/or figure reference labels in the claims is intended to identify one or more possible embodiments of the claimed subject matter in order to facilitate the interpretation of the claims. Such use is not to be construed as limiting the scope of those claims to the embodiments shown in the corresponding figures.

Although the steps in the following method claims are recited in a particular sequence with corresponding labeling, unless the claim recitations otherwise imply a particular sequence for implementing some or all of those steps, those steps are not necessarily intended to be limited to being implemented in that particular sequence.

We claim:

1. A processor comprising a plurality of arithmetic logic units (ALUs) and a plurality of registers, wherein:
the processor performs hash processing on a string message comprising N message blocks to generate a message digest from the string message;
the processor uses (1) a message schedule having G message-schedule words and (2) a plurality of working variables, each working variable associated with a corresponding register of the plurality of registers;
the processing of each message block of the N message blocks comprises G message-schedule iterations, each message-schedule iteration comprising:
  (i) processing a message-schedule word corresponding to the iteration;
  (ii) processing values of the working variables;
  (iii) updating at least one working variable based on the processed message-schedule word; and
  (iv) updating at least one working variable based on the processed value of one or more working variables;
the processor performs, in at least one of the message-schedule iterations, at least one of:
  (a) generating the message-schedule word corresponding to a next message-schedule iteration;
  (b) pre-processing the value of at least one working variable for the next messageschedule iteration; and
  (c) varying, from a previous message-schedule iteration, relationships of two or more of the working variables to the corresponding registers; and
the processor uses all the ALUs of the plurality of ALUs in parallel in at least one of the message-schedule iterations.

2. The processor of claim 1, wherein the processor generates, in at least one of the message-schedule iterations, the message-schedule word corresponding to the next message-schedule iteration.

3. The processor of claim 2, wherein, for each message block of the N message blocks:
the message block comprises S words, where S<G;
the first S message-schedule words of the message schedule are equal to the S words of the message block;
prior to the first of the G message-schedule iterations, the first message-schedule word is read into the plurality of registers;
during each of the message-schedule iterations from the first iteration to the (S−1)th iteration, the corresponding message-schedule word for the next message-schedule iteration is read into the plurality of registers; and
during each of the message-schedule iterations from the Sth iteration to the (G−1)th iteration, (i) the message-schedule word for the next message-schedule iteration is calculated from a plurality of message-schedule words for prior message-schedule iterations and (ii) the message-schedule word for the next message-schedule iteration is stored in the plurality of registers.

4. The processor of claim 1, wherein the processor pre-processes, in at least one of the message-schedule iterations, the value of at least one working variable for the next messageschedule iteration.

5. The processor of claim 4, wherein:
the plurality of working variables comprises first, second, third, fourth, and fifth working variables (e.g., a, b, c, d, e, respectively);
prior to the first message-schedule iteration, an iteration-dependent constant for the first message-schedule iteration is added to the value stored in the register corresponding to the fifth working variable;
the processing of values of the working variables comprises summing a plurality of values including the fifth working variable; and
during each of the message-schedule iterations from the first iteration to the (G-1)th iteration, the iteration-dependent constant for the next iteration is added to the value stored in the register corresponding to the first working variable.

6. The processor of claim 1, wherein, in at least one of the message-schedule iterations, the processor varies, from a previous message-schedule iteration, the relationships of the two or more of the working variables to the corresponding registers.

7. The processor of claim 6, wherein:
the plurality of working variables comprises first, second, third, fourth, and fifth working variables;
the first, second, third, fourth, and fifth working variables are associated with register handles $R_a$, $R_b$, $R_c$, $R_d$, and $R_e$, respectively;
the values of the first, second, third, fourth, and fifth working variables are stored in registers D0, D1, D2, D3, and D4;
the relationship between each register handle and the registers D0, D1, D2, D3, and D4 in iteration t is represented by:

$$R_a = D[(5-(t \bmod 5)) \bmod 5]$$

$$R_b = D[(6-(t \bmod 5)) \bmod 5]$$

$$R_c = D[(7-(t \bmod 5)) \bmod 5]$$

$$R_d = D[(8-(t \bmod 5)) \bmod 5]$$

$$R_e = D[(9-(t \bmod 5)) \bmod 5],$$

where mod is a modular arithmetic operator.

8. The processor of claim 1, wherein the processor performs, in at least one of the message-schedule iterations:
(A) generating the message-schedule word corresponding to the next message-schedule iteration;
(B) pre-processing the value of at least one working variable for the next messageschedule iteration; and (C) varying, from the previous message-schedule iteration, the relationships of two or more of the working variables to the corresponding registers.

9. The processor of claim 1, wherein the hash processing comprises N message-block iterations, wherein:
each message-block iteration comprises the processing of one sequential message block of the N message blocks to update a hash value; and
the message digest is based on the updated hash value after the Nth iteration.

10. The processor of claim 1, wherein the updating of the at least one working variable is based on the processed values of one or more of the other working variables.

11. A method for a processor comprising a plurality of arithmetic logic units (ALUs) and a plurality of registers, the method comprising:
performing hash processing on a string message comprising N message blocks to generate a message digest from the string message;
using (1) a message schedule having G message-schedule words and (2) a plurality of working variables, each working variable associated with a corresponding register of the plurality of registers;
processing each message block of the N message blocks in G message-schedule iterations, each message-schedule iteration comprising:
(i) processing a message-schedule word corresponding to the iteration;
(ii) processing values of the working variables;
(iii) updating at least one working variable based on the processed message-schedule word; and
(iv) updating at least one working variable based on the processed value of one or more working variables;
performing, in at least one of the message-schedule iterations, at least one of:
(a) generating the message-schedule word corresponding to a next message-schedule iteration;
(b) pre-processing the value of at least one working variable for the next messageschedule iteration; and
(c) varying, from a previous message-schedule iteration, relationships of two or more of the working variables to the corresponding registers; and
using, by the processor, all the ALUs of the plurality of ALUs in parallel in at least one of the message-schedule iterations.

12. The method of claim 11, further comprising:
generating, in at least one of the message-schedule iterations, the message-schedule word corresponding to the next message-schedule iteration.

13. The method of claim 12, wherein, for each message block of the N message blocks:
the message block comprises S words, where S <G; and
the first S message-schedule words of the message schedule are equal to the S words of the message block, the method comprising:
reading, prior to the first of the G message-schedule iterations, the first message-schedule word into the plurality of registers;
reading, during each of the message-schedule iterations from the first iteration to the (S−1)th iteration, the corresponding message-schedule word for the next message-schedule iteration into the plurality of registers; and
calculating, from a plurality of message-schedule words for prior message-schedule iterations, and storing, in the plurality of registers, the message-schedule word for the next message-schedule iteration, during each of the message-schedule iterations from the Sth iteration to the (G−1)th iteration.

14. The method of claim 11, comprising pre-processing, in at least one of the message-schedule iterations, the value of at least one working variable for the next message-schedule iteration.

15. The method of claim 14, wherein:
the plurality of working variables comprises first, second, third, fourth, and fifth working variables (e.g., a, b, c, d, e, respectively);
prior to the first message-schedule iteration, an iteration-dependent constant for the first message-schedule iteration is added to the value stored in the register corresponding to the fifth working variable;
the processing of values of the working variables comprises summing a plurality of values including the fifth working variable; and
during each of the message-schedule iterations from the first iteration to the (G−1)th iteration, the iteration-dependent constant for the next iteration is added to the value stored in the register corresponding to the first working variable.

16. The method of claim 11, comprising, in at least one of the message-schedule iterations, varying, from a previous message-schedule iteration, the relationships of the two or more of the working variables to the corresponding registers.

17. The method of claim 16, wherein:
the plurality of working variables comprises first, second, third, fourth, and fifth working variables;
the first, second, third, fourth, and fifth working variables are associated with register handles $R_a$, $R_b$, $R_c$, $R_d$, and $R_e$, respectively;
the values of the first, second, third, fourth, and fifth working variables are stored in registers D0, D1, D2, D3, and D4; and
the relationship between each register handle and the registers D0, D1, D2, D3, and D4 in iteration t is represented by:

$$R_a = D[(5-(t \bmod 5)) \bmod 5]$$

$$R_b = D[(6-(t \bmod 5)) \bmod 5]$$

$$R_c = D[(7-(t \bmod 5)) \bmod 5]$$

$$R_d = D[(8-(t \bmod 5)) \bmod 5]$$

$$R_e = D[(9-(t \bmod 5)) \bmod 5],$$

where mod is a modular arithmetic operator.

18. The method of claim 11, comprising, in at least one of the message-schedule iterations:
(A) generating the message-schedule word corresponding to the next message-schedule iteration;
(B) pre-processing the value of at least one working variable for the next message-schedule iteration; and
(C) varying, from the previous message-schedule iteration, the relationships of two or more of the working variables to the corresponding registers.

19. The method of claim 11, wherein the hash processing comprises N message-block iterations, wherein:
each message-block iteration comprises the processing of one sequential message block of the N message blocks to update a hash value; and
the message digest is based on the updated hash value after the Nth iteration.

20. The method of claim 11, wherein the updating of the at least one working variable is based on the processed values of one or more of the other working variables.

* * * * *